US011557115B2

United States Patent
Nurkić Kačapor et al.

(10) Patent No.: US 11,557,115 B2
(45) Date of Patent: Jan. 17, 2023

(54) SYSTEM TO DETECT UNDERGROUND OBJECTS USING A SENSOR ARRAY

(71) Applicant: ZEN-O L.L.C., Washington, DC (US)

(72) Inventors: Mak Edvin Nurkić Kačapor, Washington, DC (US); Justin James Yang, Potomac, MD (US)

(73) Assignee: ZEN-O L.L.C., Washington, DC (US)

( * ) Notice: Subject to any disclaimer, the term of this patent is extended or adjusted under 35 U.S.C. 154(b) by 0 days.

(21) Appl. No.: 17/586,677

(22) Filed: Jan. 27, 2022

(65) Prior Publication Data

US 2022/0237909 A1 Jul. 28, 2022

Related U.S. Application Data

(60) Provisional application No. 63/142,394, filed on Jan. 27, 2021.

(51) Int. Cl.
*G06V 20/17* (2022.01)
*G06V 10/75* (2022.01)
*G06V 10/82* (2022.01)
*B64C 39/02* (2006.01)

(52) U.S. Cl.
CPC ............ *G06V 20/17* (2022.01); *B64C 39/024* (2013.01); *G06V 10/758* (2022.01); *G06V 10/82* (2022.01); *B64C 2201/123* (2013.01); *B64C 2201/127* (2013.01); *G06V 2201/05* (2022.01)

(58) Field of Classification Search
CPC ...... G06V 20/17; G06V 10/758; G06V 10/82; G06V 2201/05; B64C 39/024; B64C 2201/123; B64C 2201/127

USPC .......................................................... 382/181
See application file for complete search history.

(56) References Cited

U.S. PATENT DOCUMENTS

| 5,592,170 | A | * | 1/1997 | Price | F41H 11/16 342/22 |
| 10,782,691 | B2 | * | 9/2020 | Suresh | G06V 20/00 |
| 2016/0097851 | A1 | * | 4/2016 | Zhang | G05D 1/102 342/22 |
| 2016/0282457 | A1 | * | 9/2016 | Mazzaro | G01S 7/414 |
| 2018/0072415 | A1 | * | 3/2018 | Cantrell | B64D 1/22 |
| 2019/0019066 | A1 | * | 1/2019 | Fryshman | A01M 5/04 |

(Continued)

FOREIGN PATENT DOCUMENTS

| KR | 20150052939 | * | 5/2015 | ............. F41H 11/12 |
| NL | 2012900 B1 | | 4/2016 | |
| WO | WO-2012050595 A1 | * | 4/2012 | ........... G01S 13/885 |

OTHER PUBLICATIONS

Aerobotics 7. "Making the World a Safe Place" web page, located on the Internet at: https://aerobotics7.com/ (2022), 7 pages.

*Primary Examiner* — Jerome Grant, II
(74) *Attorney, Agent, or Firm* — Womble Bond Dickinson (US) LLP; Joseph Bach, Esq.

(57) ABSTRACT

Systems and method to detect presence of buried landmines in a suspect area. A drone is outfitted with a ground penetrating radar, an infrared camera, and a metal detector mounted onto a leveling platform. The drone is flown over the suspect area while maintaining the leveling platform horizontal. Signals from the ground penetrating radar, an infrared camera, and a metal detector are converted into radargram, thermal image, and metal gram. Convolutional neural networks are applied to each of the into radargram, thermal image, and metal gram to detect anomalies.

28 Claims, 5 Drawing Sheets

(56) References Cited

U.S. PATENT DOCUMENTS

| | | | |
|---|---|---|---|
| 2019/0064362 A1* | 2/2019 | Scott | G01S 13/865 |
| 2019/0274192 A1* | 9/2019 | Fryshman | H05B 6/101 |
| 2020/0143210 A1* | 5/2020 | Fryshman | H05B 6/06 |
| 2021/0192629 A1* | 6/2021 | Tofte | H04N 5/44 |
| 2021/0255357 A1* | 8/2021 | Fonts | B63B 35/00 |

* cited by examiner

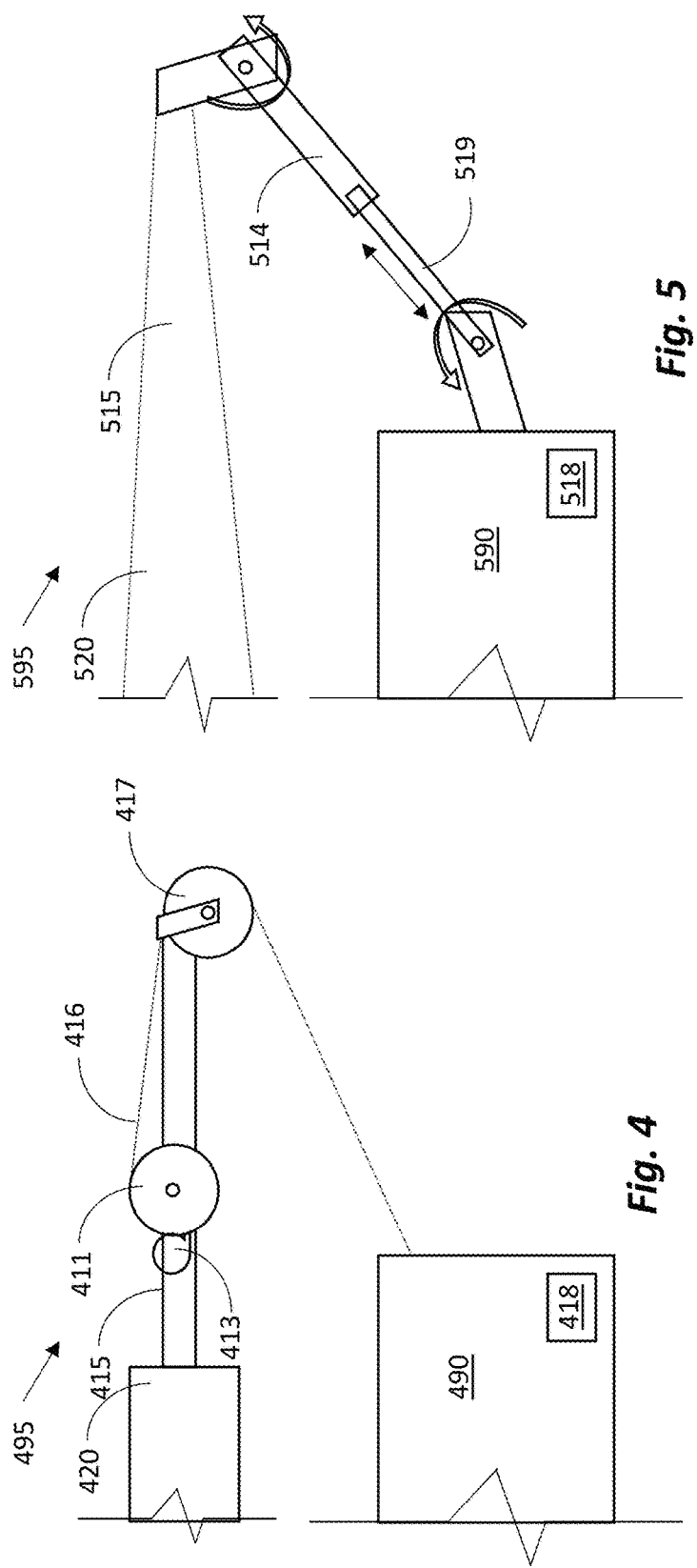
Fig. 5
Fig. 4
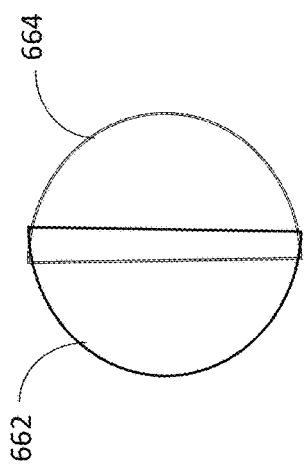
Fig. 6

SYSTEM TO DETECT UNDERGROUND OBJECTS USING A SENSOR ARRAY

CROSS-REFERENCE TO RELATED APPLICATIONS

This application claims priority from U.S. Provisional Application No. 63/142,394, filed on Jan. 27, 2021, the disclosure of which is incorporated herein by reference in its entirety.

BACKGROUND

1. Field

This disclosure relates generally to an apparatus for detection of buried objects. More specifically, the present invention is an apparatus for detecting and identifying buried objects, such as landmines.

2. Related Art

It is estimated that there are about 103 million landmines buried in 56,000 square kilometers in 66 countries. According to the United Nations everyday people die or lose limbs from stepping on a landmine, mostly in countries at peace—and the majority of victims are civilians. At the current rate it is estimated that removing these landmines will take 89 years. Thus, new systems and method are needed to expedite the efforts to remove these landmines.

Ground Penetrating Radar (GPR) is a non-intrusive method of surveying sub-surfaces. This nondestructive method uses electromagnetic radiation in the microwave band (UHF/VHF frequencies) of the radio spectrum and detects the reflected signals from subsurface structures. In operation, a GPR transmitter and antenna emits electromagnetic energy into the ground. When the energy encounters a buried object or a boundary between materials having different permittivity, it may be reflected, refracted, or scattered back to the surface. A receiving antenna can then record the variations in the return signal. These signals can be extrapolated by a computer into a radargram, which shows the location and depth of detected objects. The limitation of this device is that it only can detect the presence of an object, and not any specific details to ascertain in greater detail what that object is.

A metal detector is an electronic tool that is able to detect the presence of metal nearby and emits a signal notifying the user that an object has been detected. A metal detector is composed of an oscillator creating an alternating current that flows through a coil, then producing an alternating magnetic field. If a piece of electrically conductive metal is close to the coil, eddy currents will be instigated (inductive sensor) in the metal, and this creates a magnetic field of its own. If another coil is used to measure the magnetic field (acting as a magnetometer), the change in the magnetic field, because of the metallic object, can be detected. The limitation of this technology is that the object to be surveyed must be metallic.

A thermographic camera, which can also be called an infrared (IR) camera or thermal imaging camera, is a device that creates an image using infrared radiation. It is similar to a common camera that forms an image using visible light, but instead it captures an image from infrared waves on the electromagnetic spectrum. The way an infrared camera works is that it detects infrared energy and turns it into an electronic signal, which is then processed to create a thermal image. These images let the user see how the heat is distributed as well as showing the temperature, which proves useful when trying to pinpoint the location of an otherwise invisible object. Infrared cameras are generally sensitive to wavelengths from about 1,000 nm to about 14,000 nm. Depending on the type of camera being used, the range changes. Pixel configurations of the camera can range from 80×60 to 1280×1024 pixels or more. These heat signatures can be extrapolated into maps, which can highlight areas of interest that could have the object that is being surveyed.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments provide a multi-sensor airborne platform for surveying land to identify buried items in the surveyed area. The airborne platform may include maned or unmanned flying platform, such as an aircraft or a drone. Multiple sensors are used to scan or image the surveyed area using different technologies. In disclosed embodiments, at least three sensor technologies are incorporated, including ground penetrating radar, metal detector, and thermal imaging.

In disclosed aspects, the signal of each of the multi-sensor system is analyzed to identify anomalies, indicating locations of potentially buried item. Each signal is assigned a probability that an identified item has been detected. The probabilities from the three sensors are then analyzed to assign a global probability that a buried item has been identified.

Disclosed embodiments include a system for discovering and identifying items buried underground, especially landmines. In disclosed embodiments the system is airborne, e.g., mounted on an aerial drone that holds all the rest of the system, transporting the components to survey a suspected area. The airborne platform includes sensors to measure the gyroscopic orientation of the platform and the various sensors. The sensors are mounted on a leveling platform, so one sensor measures the orientation of the airborne platform while another sensor measure the orientation of leveling platform. The leveling platform is actuated to maintain the leveling platform at a desired orientation with respect to the ground, notably horizontal orientation.

The object detection sensors include a sensor to detect the presence of metal in the ground, such as a metal detector, a sensor to thermally image the ground and detect abnormalities in the heat signatures in the ground, such as an IR camera, and a sensor to detect disturbances in the ground differing from the surrounding dirt, such as a ground penetrating radar. The data may be storage onboard or transmitted to a ground-based station. Similarly, processing of the data may be performed onboard or on a ground-based station.

Disclosed embodiments include a method of using a computer processor to conduct underground exploration, by imparting radar energy waves into the earth from a radar source over suspect area, receiving a plurality of reflected signals in response to the radar energy waves; scanning the suspect area with infrared (IR) camera to generate IR signals; scanning the suspect area with a magnetic field and detecting changes in magnetic flux to generate flux signals; generating a radargram from the plurality of reflected signals; generating a thermal image from the IR signals; generating a metal gram from the flux signals; applying convolutional neural network to each of the radargram, thermal image and metal gram to assign a probability score to each of the radargram thermal image and metal gram, each of the probability scores indicating a probability that an item is buried in the suspect area; and generating an overall probability score using the probability scores assigned to the radargram, thermal image and metal gram.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 4 is a side view of a leveling platform according to an embodiment;

FIG. 5 is a side view of a leveling platform according to another embodiment;

FIG. 6 is a top view of a double-D coil arrangement for the metal detector according to an embodiment;

DETAILED DESCRIPTION

Embodiments of the inventive system will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

Embodiments disclosed herein include an airborne platform that can be deployed to survey land for buried items. One application of concern is the identification of buried landmines; therefore, while disclosed embodiments may be used to identify other buried items, various examples disclosed herein relate to the identification of buried landmines. The platform may be a system that is attachable to a flight vehicle, such as an airplane or a helicopter, or it may be an unmanned drone. The drone may be autonomous or may be controlled remotely from the ground by an operator.

Architecture

Figure 1:
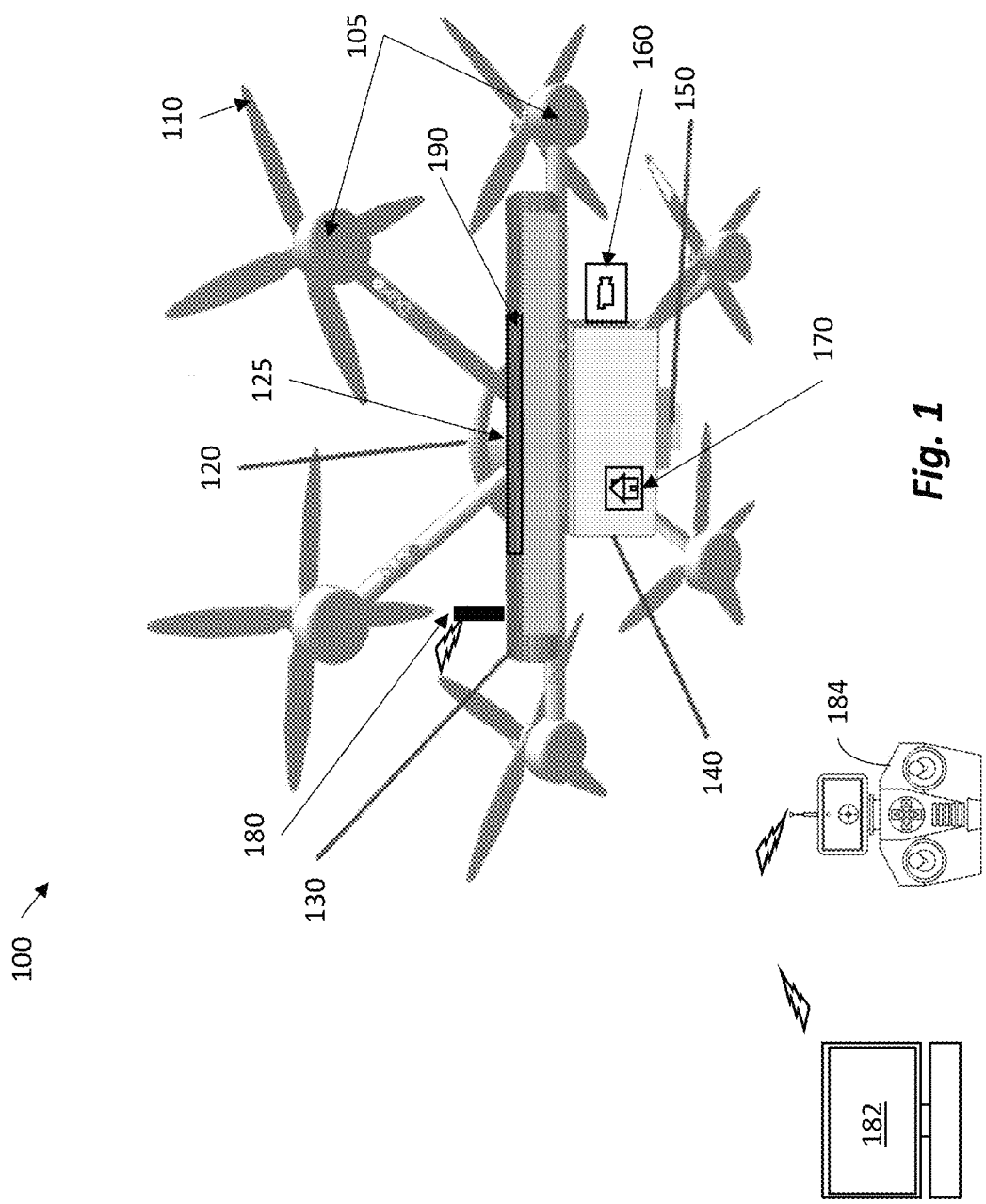
FIG. 1 is an illustration of the airborne platform according to an embodiment of the present invention.

FIG. 1 illustrates an embodiment wherein the airborne platform is a drone. The drone may be a commercially available drone outfitted with the survey system, or it may be a specially manufactured drone with the survey system integrated therewith. As shown in FIG. 1, the drone 100 has electrical motors 105 which are coupled to propellers 110 to provide lift and flight directionality. A central housing 120 includes a processor 125 (obscured in FIG. 1 by the housing 120) that operates the sensors and analyzes the signals issued by the sensors. In some embodiments the processor 125 may also control the operation of the drone 100, while in other embodiments a separate flight controller is included in housing 120 to control the operation, i.e., flight dynamics of the drone 100.

In the embodiment illustrated in FIG. 1, the survey system includes a metal detector (MD) 130, a sensor array of a ground penetrating radar (GPR) 140, and an infrared (IR) camera 150. The signals from these sensors are sent to the processor 125, which operates a pipeline to combine the sensors data into a single classification indicating the presence of an object to be investigated.

A problem recognized by the subject inventors is that an airborne platform, such as a drone, a helicopter, an airplane, etc, changes its yaw, roll, and pitch orientations as it flies. However, for better data integrity and quality it is preferred that during an aerial scan at least the roll and pitch would not change. Prior art drones have used gimbals to mount a camera, however, gimbals are still subject to acceleration and wind forces. Thus, in disclosed embodiments the sensors, i.e., MD, GPR and IR camera are mounted onto an active leveling platform 190 that maintains pitch and roll orientation independently of the airborne platform. The active leveling platform 190 may receive signals indicative of the roll and pitch of the airborne platform, e.g., from gyroscopes and/or accelerometers, or from a flight controller, and apply opposite motions to counter the airborne platform motion. In disclosed embodiments the active leveling platform maintains a horizontal orientation during ground scanning operations.

As further illustrated in FIG. 1, the airborne platform may include imaging system 160 for generating images at the visible spectrum. These images can be used for navigation, obstacle avoidance, and for providing a visible map of the location of buried items of interest. That is, the various disclosed sensors may be spatially registered with the field of view of the camera to enable pinpointing in a visible image the location of detected objects. Also, optionally the airborne platform may include a global positioning system (GPS) 170. The GPS 170 provides latitude and longitude coordinates of the location of the platform, that may be registered to the field of view of the sensors and imaging system 160.

A wireless communication system 180 may also be included on the airborne platform. The wireless communication system 180 may serve several functions and may utilize more than one transceiver (not shown). In one example, the wireless communication system sends telemetry and sensory data from the airborne platform to a land base computing system 182. This enables offloading the processing of the raw data to a land based computing system

182. Also, it reduces the data storage requirement on the airborne platform 100. Additionally, the wireless communication system 180 may be used for remote controlling of the airborne platform using remote controller 184, especially when it is unmanned.

Figure 2:
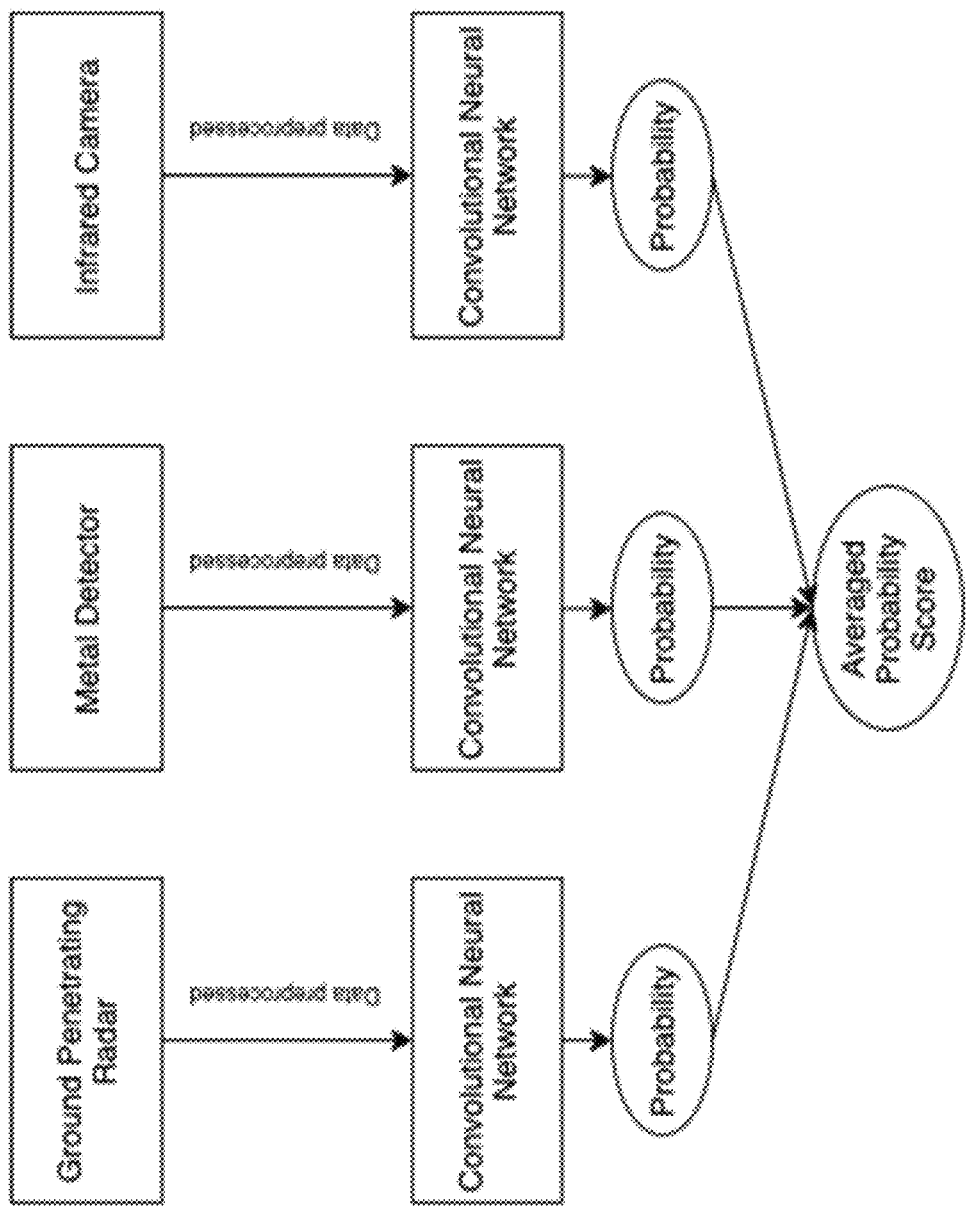
FIG. 2 is a flowchart of a process according to an embodiment of the present invention.

In one embodiment, at least part of the data analysis is performed onboard the airborne platform 100, while in others part or all of the data analysis can be performed on a ground-based processor 182. In either case, as illustrated in FIG. 2, to perform the analysis of the data received form the sensors, the processor 125 comprises three Convolutional Neural Networks (CNN), where each neural network is applied to one sensor. The pipeline initially pre-processes and converts all sensor data into graphical images for convolution operations to be conducted on them. For GPR data, the result is a radargram image. Different underground anomalies produce unique patterns in the radargram. As a tool for pattern recognition, CNNs are well suited to discern objects of interest from signatures normally produced by rocks and other mundane objects.

For MD 130 data, the processor 125 first establishes a rectangular land plot of dimensions equal to the field of view of the IR camera 150 and GPR 140 and divide it into an equally spaced square grid. The detector voltage response of MD 130 at each grid point is measured, which allows the processor 125 to obtain a 2-dimensional matrix of MD data for any land plot. This matrix is then inputted into the CNN.

For the IR camera 150 data, the data is already in image form and its CNN performs classification on each frame. Different objects can manifest different thermos-physical properties than the surrounding soil and minerals, and retain and release heat at differing rates. The IR CNN finds differences in temperature in surface soil which would indicate an anomaly underneath that corresponds to an object.

The output of each CNN is a number between 0 and 1 corresponding to the probability of the existence of the object targeted by the survey. The pipeline averages the outputs of all neural networks to obtain an overall probability score. In one embodiment, a straight line average is implemented, while in other embodiment a weighted average is implemented.

Sensors

Various sensors are employed to identify suspect buried items, especially landmines. For improved accuracy and operation, the sensors are mounted on an active leveling platform that is suspended below the airborne platform at a horizontal orientation. The main sensors are described below.

Ground Penetrating Radar 140 is a non-intrusive detection method for structures buried underneath the ground's surface. GPR 140 uses radio wave pulses in the spectrum from 10 MHz to 2.6 GHz to penetrate a large range of surfaces, e.g., sand, rock, soil, ice, etc. In disclosed embodiments an assessment of the ground's surface media is performed prior to selecting the frequency and signal strength of the GPR 140. The assessment can be performed by analyzing the ground at the location, by analyzing data from the various sensors of the airborne platform 100, by using the GPS coordinates and various reference literature for the GPS coordinates of the scanned area, or all of these methods combined. One value of importance is the surface's electrical conductivity, since higher conductivity causes wave attenuation and thus reduces the range of the GPR 140. Thus, by determining the conductivity value, an appropriate frequency and power output can be set for the GPR 140.

The GPR 140 pulses reflect, refract, or scatter from subsurface objects with different permittivities with respect to other surrounding objects and the ground. In order to detect various objects buried at different depths and to provide data at different resolutions, in an embodiment the GPR 140 operates at multiple frequencies. For example, lower frequencies at the MHz range, e.g., 5-500 MHz are used for deep penetration into higher depths underground. Conversely, higher frequencies, e.g., in the GHz range, e.g., 1-2.6 GHz, can be used to increase data resolution. Thus, in one embodiment a first scan of an area may be performed using the lower frequency to identify regions of interest within the scanned area. Then a second scan of the regions of interest can be performed using the high frequency to provide further data relating to the regions of interest.

In disclosed embodiments, during the operation of the GPR 140, the airborne platform 100 flies at between one to two meters above the ground surface. The signals from the GPR 140 can be used to produce multiple radargrams of different sectional perspectives (lengths, widths, depths). The multiple radargrams can be compiled to produce a tomographic (three dimensional) image of the ground below the surface. The onboard or land-based processor can then apply CNN to the radargrams and/or tomographic images to identify anomalies, and assign a probability value that the anomaly indicates a buried object, e.g., a buried landmine.

Another sensor to be used in disclosed embodiments in an IR camera. Infrared Thermography detects electromagnetic radiation in the infrared spectrum (300 GHz-430 THz) emitted from objects, and outputs heat-based images of a subject through a lens, similar to a regular camera. The IR sensor takes advantage of the differences in thermophysical properties of landmines and the ground media they are buried in. In particular, this applies to the detection of "Minimal Metal Mines" (MMMs), which have plastic casings that are hard to detect with metal detection. In different conditions such as weather, climate, and time of day, plastic landmines will retain and radiate different values of heat than a given soil, sand, gravel, or other ground medium around them. Different ground conditions, such as soil, gravel, sand, and others carry different heat signatures at different temperatures and times of the day. The plastic carries a different signature than each of these, resulting in anomalies on the heat maps. Because of this, when captured with IR Thermography, the surface heat levels above and around landmines are different from the ground around them, producing detectable anomalies on the heat map. This will allow for the detection of plastic objects or objects containing plastic near the surface.

Range is not a concern for IR Thermography, as thermographic cameras can reach distances further than 1 km. The target depth for disclosed embodiments for detecting buried items is up to about 3 feet into the ground, although it may vary based on ground medium. The benefit of the thermophysical properties is that they change the surrounding ground as well through heat transfer, making depth range negligible, so long as the surface is within view. That is, the thermophysical property of the plastic, specifically its ability to retain heat, is different from the ground around it. But due to heat transfer, heat flows between the ground around the plastic and shows up on the IR reading. So, the camera's depth isn't as important as just ensuring that the ground surface is in view.

The camera to be used in disclosed embodiments is an uncooled thermographic camera that can operate at room and ambient temperatures. This camera relies on the change in electrical properties (voltage, current, and resistance) of sensors when heated by thermal radiation. An uncooled camera works better in the variable conditions in the field of landmine detection, and substantially decreases the sensor size, electrical consumption, and other factors that would otherwise limit operations with cooled thermographic cameras.

The thermographic cameras produce a compiled snapshot of a suspect area using a grid method, covering the entire field with multiple image captures. IR Thermographic cameras produce heat-based images of varying resolution, from 160×120 pixels to 1280×1024. Due to the data processing limitations, including the Convolutional Neural Network, in disclosed embodiments the images will be produced in a resolution of at least 720×480, to avoid false positives and unclear probability scores in the CNN. Once the thermographic camera produces the images and full snapshot, an onboard or a land-based computer can process the surface heat anomalies (objects) found in the thermographic survey in a Convolutional Neural Network. The network then assigns a probability value for landmines based on size and location. A human expert may also review the produced images and identify anomalies, if necessary.

Yet another sensor to be used in disclosed embodiments in a metal detector. In disclosed embodiments metal detection operates using Very Low Frequency (VLF, 3-30 kHz) or pulse induction sensing. A pulse induction metal detector uses a single coil to emit and receive rapid high-voltage pulses in multiple frequencies at a time. The pulses decay as they re-enter the circuit through the coil due to the resistance of the system. Metal objects, like landmines, can induce a magnetic field caused by these pulses, which decay differently than the returning pulses. This method of metal detection observes and measures the decay of the current returning to the coil and can identify metal objects in an area by pulsing many times per second.

A VLF metal detector uses two coils, an emitting coil to produce a magnetic field and a receiving coil to observe changes to the magnetic flux introduced by metal objects in the environment, such as landmines and landmine components. VLF metal detection uses radio waves in the range of 1-100 KHz. For the two-coil method to work, the transmit and receive coils 662 and 664 will be placed in a "double d" alignment, as illustrated in FIG. 6, where they partly overlap in a "back to back" orientation. This alignment allows the opposite polarity of the fields so that emission does not interfere with the reception, and that the net magnetic field is exactly zero when there are no objects interfering. Moreover, the double-D arrangement is not affected by heavy ground mineralization and operates smoothly in areas where the ground matrix tends to shift.

Different frequencies are most effective at detecting different metal compositions and object sizes, so to account for this variation disclosed embodiments may utilize a metal detector that scans in multiple frequencies in one pass. In one example, the scanning is performed while sweeping frequencies from 1.5 kHz to 25.5 kHz, while in another embodiment the frequency sweep is from 1.5 kHz to 100 kHz. The frequency sweep may be performed in steps of, e.g., 1-5 kHz. In this respect, the double-D arrangement provides wider swath per scan than other coils arrangements, such as concentric coils, thus requiring less overlapping of scans.

The VLF metal detection method can identify the groups and types of metals detected. The exact value of phase shift of the oscillation of the magnetic field created by the metal objects (landmines) is calculated in contrast with the emitted magnetic field. This value identifies the exact type of metal that is detected, and makes VLF detectors very useful and reliable for the specific detection and identification of specific metal objects, like certain types of landmines in a certain country/region.

The pulse induction method generally cannot identify the specific metals detected with accuracy, but may use Ferrous-Conductive discrimination technology. This technology maps ferrous and conductive properties of the metals detected, and can discriminate between broad groups of metals using this data.

Example

Figure 3:
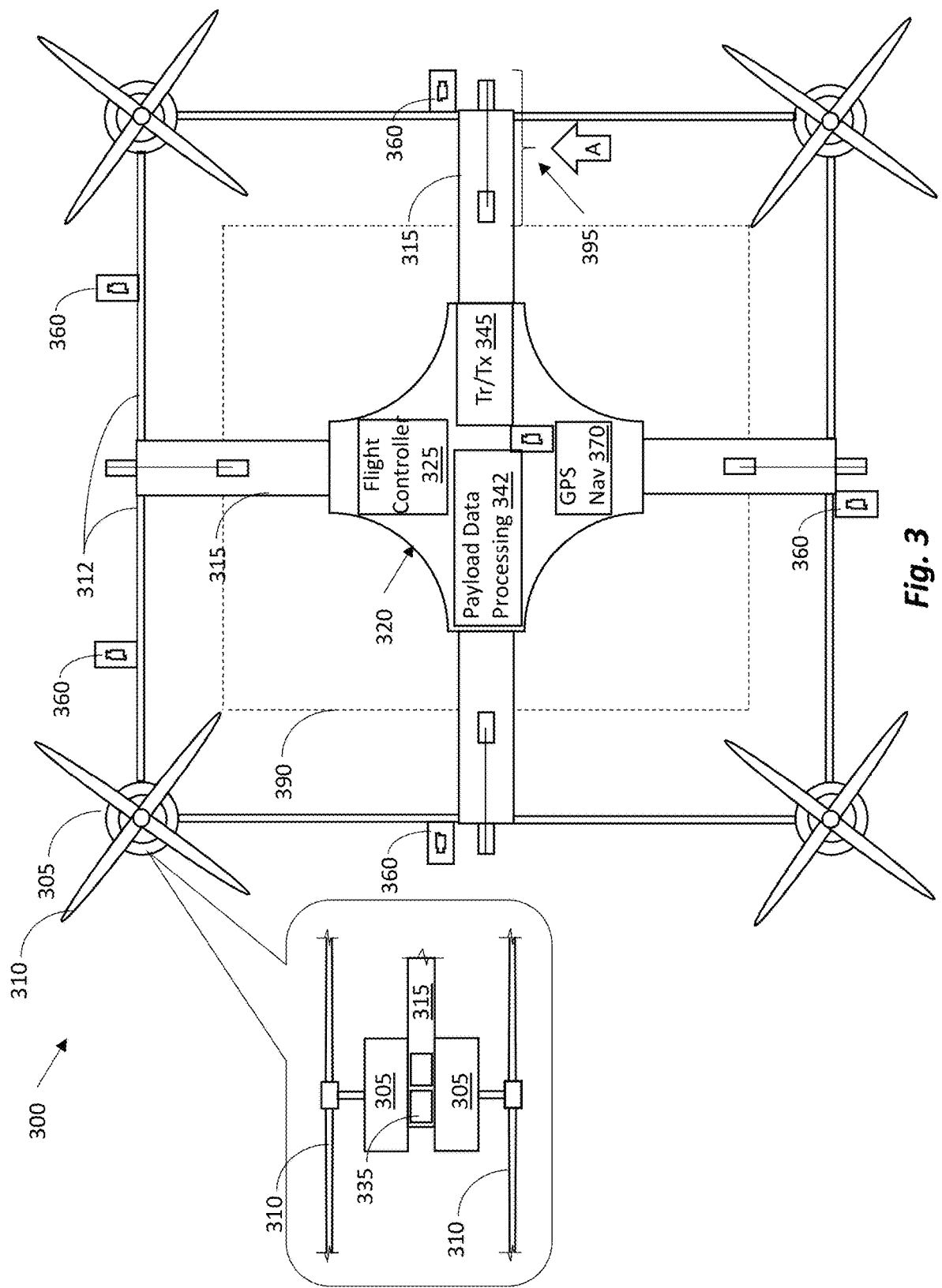
FIG. 3 is a top view of a drone according to disclosed embodiment.

A top view of an unmanned drone 300 is illustrated in FIG. 3. The body 320 is constructed of carbon fiber frame and is in the shape of an isotoxal star and is at the center intersection of a four-square grid formed with stalks 312, which are connected to arms 315. One end of each arm 315 is connected to the body 305, while the two stalks 312 are connected to the free end of each arm 315. In other examples, the arms 315 may be an integral part of the body 305. The intersection of each two stalks 312 supports a pair brushless motors 305, pointing in opposite directions. This arrangement is shown from the side view in the callout. Each pair of motors 305 has two propellers 310 operate in two parallel planes with their footprint overlapping each other. In that respect, it can be said that one motor is pointing up while the other motor is pointing down.

The drone is operated by a flight controller 325 housed within the body 305. Each motor 305 receives its power from a dedicated electronic speed controller (ESC) 335, which allows the drone flight controller 325 to control and adjust the speed of the drone's electric motors 305. A signal from the flight controller 325 causes the ESC 335 to raise or lower the voltage to the dedicated motor 305 as required, thus changing the speed of the propeller 310 independently for each of the motors 305. Wiring for each motor is housed within the stalks 312, while the ESCs may be placed with the motors or at the edge of the arms 315. Placing the ESC in the arm 315 reduces the wiring within the stalks 312, as each stalk needs to house only the wires for one ESC-motor pairing.

Drone 300 may operate in manual mode or autopilot mode. In manual mode the transceiver section 345 communicates with a remote controller operated by an operator. The operator then controls the flight of the drone via wireless communication. In autopilot mode the area to be mapped is uploaded to the drone, and the flight path may either be pre-programmed or the flight controller 325 may segment the uploaded area to be scanned and plot a flight path to generate edge-overlapping paths to cover the entire area.

To assist in navigation and flight control, several cameras 360 are mounted on the drone 300. In this particular example, each side of the drone 300 includes at least one camera, thus providing a 360-degree view around the drone. If desired, another camera may be installed on top of the body 320 and one on the bottom of the leveling platform 390. In addition to navigation, the imagery from the cameras may also be used to better register the locations of detected buried object to the topography. Also, the front of the drone 300 is equipped with two cameras, implementing a stereo visual odometry enabling range measurements to obstacle in the flight path of the drone 300. The visual odometry produces high quality depth-sensing imagery, which the onboard controller 325 uses to determine distance and size of objects in the flight path. The depth-defined vectors for obstacles in-path will allow onboard navigation or manual flight control to avoid any obstacles. Although radar and LiDar may be used for distance measurements, such methods prove inaccurate for the detection of small objects, like leaves and branches. Conversely, depth imaging from stereo vision is superior for small objects within close detection range, e.g., 1-10 meters.

The active leveling platform 390 is illustrated in FIG. 3 in dashed lines. It is kept level, or in horizontal orientation, during flight using the leveling mechanism 395. One embodiment of the leveling mechanism is illustrated in FIG. 4, taken from the view point identified by the arrow marked A in FIG. 3. In this embodiment each arm 415 is attached to the body 420 and supports a leveling mechanism in the form of spools. Specifically, an inboard spool 411 is attached to a motor 413 that rotates the spool 411 to dispense or retrieve cable 416 as required to level the platform 490. Outer spool 417 is a free-rotating spool that is only used as a cable guide for cable 416. Sensor 418 may provide signals indicative of the leveling orientation of the leveling platform 490, and may be any one or more of an accelerometer, an inclinometer, a gyroscope, etc.

Another embodiment of the leveling mechanism is illustrated in FIG. 5. In the embodiment of FIG. 5 the "arm" 515 is an integral part of the body 520. In FIG. 5, a linear actuator is pivotally mounted onto the free end of the arm 515, and the extendable rod 519 of the linear actuator is pivotally mounted onto the leveling platform (see curved arrows). Sensor 518 may provide signals indicative of the leveling orientation of the leveling platform 590, and the controller may utilize these signals to issue control signals to each of the actuators 514 mounted on each of the arms 515 so as to extend or retract the extendible rod 519 to maintain the leveling platform horizontally during the flight.

The GPS/navigation unit 370 may be used for navigation as well as data mapping, so that the location of landmines can be plotted on an accurate map in real-time. Alternatively, the GPS signal may be transmitted together with the sensors data to a land-based station for plotting suspect locations. The GPS/navigation unit 370 may include an altimeter, an accelerometer and pitch/yaw control, e.g., gyros.

The on-board data processing unit 342 may include pre-processing the data received from the sensors for transmission to a land-based computing, or it may include sufficient processing capability to completely process the sensors data using the CNNs to generate probability of buried item. The results of the processing may be transmitted wirelessly to the land-based computing in real time, or may be downloaded once the drone is recovered.

Figure 8:
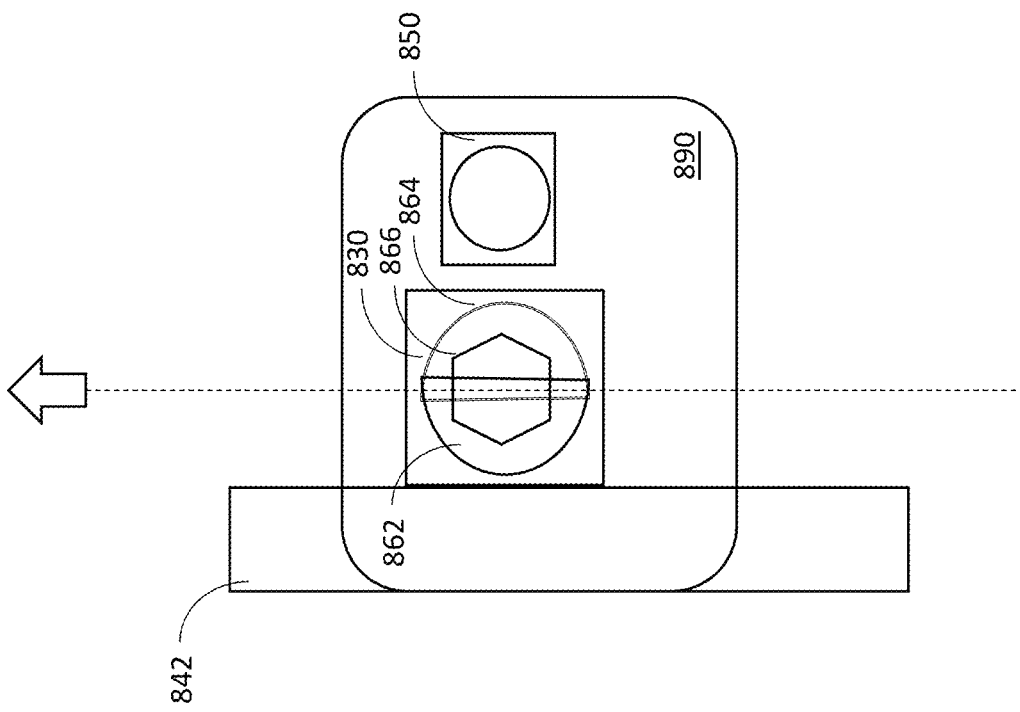
FIG. 8 is a top view of sensors arrangement on the leveling platform according to another embodiment.
Figure 7:
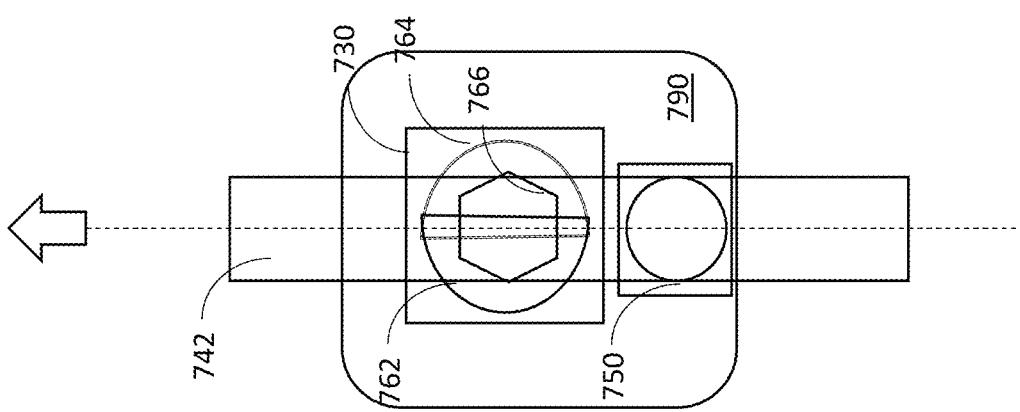
FIG. 7 is a top view of sensors arrangement on the leveling platform according to an embodiment.

FIG. 7 illustrates a top view of the leveling platform 790 with the surveying sensors mounted thereupon. The arrow illustrates the travel direction, while the dashed line illustrates the travel axis. IR camera 750 is positioned behind the metal detector 730, with its double-D coils 762 and 764 and an inductive pulse coil 766, so as to scan the ground with both sweeping frequencies from the VLF module and with the induction pulse module, respectively. The antenna 742 for the GPR overlaps the radar detector and IR camera, so it may be mounted above them. Conversely, as shown in FIG. 8, to avoid overlapping the GPR antenna is mounted on one side of the leveling platform 890, while the metal detection unit 830 and the IR camera 850 are mounted besides it.

A decision module operates on the data from the sensors to provide a probability score for each anomaly detected. As noted above, a CNN operates on each sensor output (radargrams, thermal images, metal detection maps) individually to detect anomalies. Each CNN assigns a landmine probability score to each detected anomalies, e.g., by comparing the anomaly size, intensity, gradient, etc., to a threshold or to a "fingerprint" of known landmines. In an embodiment, for each detected anomaly the scores from each sensor is weighted and then all three scores are combined to provide a global score.

In an embodiment, the individual scores may be weighted using a list of particular consideration. In an embodiment, the particular consideration includes:

a. Whenever (or when only) GPR detects an anomaly sizable enough to be a potential mine, it is flagged and given the minimum probability rating. This is to avoid missing landmines if either Metal Detection or IR fails (false negatives).

b. Whenever GPR and either other sensor detects anomalies at the same location, it is flagged and given at least a minimum landmine probability rating. This is to avoid missing landmines if either Metal Detection or IR fails (false negatives).

c. Whenever only metal detection and GPR detect anomalies, Infrared score is disregarded (metal landmine).

d. Whenever Infrared and GPR ratings are above the landmine threshold and metal is not detected, metal detection score is disregarded.

e. Whenever Infrared and GPR ratings above threshold and metal is low but not negligible, score is increased (minimal metal mine)

f. Whenever either Infrared or Metal Detection detect anomalies where GPR does not, the system is paused and reviewed for false negatives.

g. Whenever both Infrared and Metal Detection detect anomalies above threshold where GPR does not, the system identifies a detection error and the field survey is stopped.

Although the invention has been explained in relation to its preferred embodiment, it is to be understood that many other possible modifications and variations can be made without departing from the spirit and scope of the invention.

The invention claimed is:

1. A system for detecting buried items, comprising:
an airborne platform;
an actively leveling platform coupled to the airborne platform and operable to actively maintain the leveling platform in a horizontal orientation;
a ground penetrating radar (GPR) mounted on the actively leveling platform;
a metal detector mounted on the actively leveling platform;
an infrared (IR) camera mounted on the actively leveling platform;
wherein the metal detector comprises a very low frequency (VLF) coil arrangement and a pulse induction coil.

2. The system of claim 1, wherein the airborne platform comprises a drone, and the actively leveling platform is mounted below the drone.

3. The system of claim 2, wherein the drone comprises a plurality of motorized spools operable to dispense and retrieve cables, and wherein one end of each of the cables is attached to the actively leveling platform.

4. The system of claim 2, wherein the drone comprises a main body in the shape of an isotoxal star and having four arms, a plurality of stalks, each pair of stalks connected to one of the four arms at one end and supporting a plurality of motors at opposite end, the stalks and the arms defining a four-square grid with the main body located centrally to the four-square grid.

5. The system of claim 4, wherein each of the four arms includes a leveling arrangement to maintain the leveling platform horizontally during flight.

6. The system of claim 2, wherein the drone comprises a plurality of motorized actuators, each operable to extend and retract an extension rod, and wherein one end of the extendible rod is attached to the actively leveling platform.

7. The system of claim 1, wherein the ground penetrating radar operates in two frequencies, one selected in MHz range and one selected in GHz range.

8. The system of claim 1, wherein the VLF coil arrangement comprises a transmit and a receive coil arranged in a double-D topography.

9. The system of claim 1, further comprising a signal processing module receiving signals from the GPR, IR camera, and metal detector and generating a radargram, a thermographic map, and a metal detection map.

10. The system of claim 9, wherein the signal processing module further generates a tomographic map.

11. The system of claim 9, wherein the signal processing module is configured to perform the process comprising,
scanning over a suspect area radar energy waves into the earth from the GPR and receiving a reflected radar signals;
scanning the suspect area with the infrared (IR) camera to generate IR thermal signals;
scanning the suspect area with a magnetic field from the metal detector and detecting changes in magnetic flux to generate magnetic flux signals;
generating the radargram from the reflected radar signals;
generating the thermographic map from the IR thermal signals;
generating a metal detection map from the magnetic flux signals;
applying convolutional neural network to each of the radargram, the thermographic map and the metal detection map to assign a probability score to each of the radargram, the thermographic map and the metal detection map, each of the probability scores indicating a probability that an item is buried in the suspect area; and
generating an overall probability score using the probability scores assigned to the radargram, the thermographic map and the metal detection map.

12. The system of claim 11, wherein scanning the suspect area comprises flying the airborne platform over the suspect area.

13. The system of claim 12, further comprising maintaining a leveling platform of the airborne platform horizontal during the scanning of the suspect area.

14. A system for detecting buried items comprising:
an airborne platform;
an actively leveling platform coupled to the airborne platform and operable to actively maintain the leveling platform in a horizontal orientation;
a ground penetrating radar (GPR) mounted on the actively leveling platform;
a metal detector mounted on the actively leveling platform;
an infrared (IR) camera mounted on the actively leveling platform;
and further comprising a processing module having three convolutional neural networks, each receiving a signal from one of the GPR, IR camera, and metal detector and generating a probability score indicating a probability that a buried object has been detected.

15. The system of claim 14, wherein the metal detector comprises a very low frequency (VLF) coil arrangement and a pulse induction coil.

16. The system of claim 14, wherein the ground penetrating radar operates in two frequencies, one selected in MHz range and one selected in GHz range.

17. The system of claim 14, wherein the signal processing module generates a radargram, a thermographic map, and a metal detection map.

18. The system of claim 17, wherein the signal processing module further generates a tomographic map.

19. The system of claim 14, wherein the airborne platform comprises a drone, and the actively leveling platform is mounted below the drone.

20. The system of claim 14, wherein the convolutional neural network assigns a probability based on comparison to a threshold.

21. The system of claim 14, wherein the convolutional neural network assigns a probability based on comparison to a known anomaly signature.

22. The system of claim 14, wherein the convolutional neural network generates an overall probability score by applying weights to the probability score of the radargram, the thermographic map and the metal detection map.

23. The system of claim 22, wherein the weights are assigned according to particular consideration, comprising:
a. Whenever (or when only) the GPR detects an anomaly sizable enough to be a potential mine, it is flagged and given the minimum probability rating;
b. Whenever the GPR and either the IR camera or the metal detector detects anomalies at the same location, it is flagged and given at least a minimum landmine probability rating;
c. Whenever only metal detection and GPR detect anomalies, Infrared score is disregarded;
d. Whenever Infrared and GPR ratings are above the landmine threshold and metal is not detected, metal detection score is disregarded;
e. Whenever Infrared and GPR ratings above threshold and metal is low but not negligible, score is increased;
f. Whenever either Infrared or Metal Detection detect anomalies where GPR does not, the system is paused and reviewed for false negatives; and
g. Whenever both Infrared and Metal Detection detect anomalies above threshold where GPR does not, the system identifies a detection error and the field survey is stopped.

24. A system for detecting buried items, comprising:
an airborne platform;
an actively leveling platform coupled to the airborne platform and operable to actively maintain the leveling platform in a horizontal orientation;
a ground penetrating radar (GPR) mounted on the actively leveling platform;
a metal detector mounted on the actively leveling platform;
an infrared (IR) camera mounted on the actively leveling platform;
a signal processing module receiving signals from the GPR, the IR camera, and the metal detector and generating a radargram, a thermographic map, and a metal detection map;
wherein the signal processing module is configured to perform the process comprising:
receiving a reflected radar signal corresponding to a scanned area from the GPR;

receiving infrared (IR) signals corresponding to the scanned area from the IR camera;

receiving magnetic flux signals corresponding to the scanned area from the metal detector;

generating the radargram from the reflected radar signals;

generating the thermographic map from the IR signals;

generating the metal detection map from the magnetic flux signals;

applying convolutional neural network to each of the radargram, thermographic map and metal detection map to assign a probability score to each of the radargram, thermographic map and metal detection map, each of the probability scores indicating a probability that an item is buried in the suspect area; and generating an overall probability score using the probability scores assigned to the radargram, the thermographic map and the metal detection map.

25. The system of claim 24, wherein the convolutional neural network assigns a probability based on comparison to a threshold.

26. The system of claim 24, wherein the convolutional neural network assigns a probability based on comparison to a known anomaly signature.

27. The system of claim 24, wherein generating an overall probability score comprises applying weights to the probability score of the radargram, the thermographic map and the metal detection map.

28. The system of claim 27, wherein the weights are assigned according to particular consideration, comprising:

a. Whenever (or when only) the GPR detects an anomaly sizable enough to be a potential mine, it is flagged and given the minimum probability rating;

b. Whenever the GPR and either the IR camera or the metal detector detects anomalies at the same location, it is flagged and given at least a minimum landmine probability rating;

c. Whenever only metal detection and GPR detect anomalies, Infrared score is disregarded;

d. Whenever Infrared and GPR ratings are above the landmine threshold and metal is not detected, metal detection score is disregarded;

e. Whenever Infrared and GPR ratings above threshold and metal is low but not negligible, score is increased;

f. Whenever either Infrared or Metal Detection detect anomalies where GPR does not, the system is paused and reviewed for false negatives; and g. Whenever both Infrared and Metal Detection detect anomalies above threshold where GPR does not, the system identifies a detection error and the field survey is stopped.

* * * * *